(12) United States Patent
Nakasone

(10) Patent No.: US 9,212,512 B2
(45) Date of Patent: Dec. 15, 2015

(54) DAMPER

(71) Applicant: Piolax, Inc., Yokohama-shi (JP)

(72) Inventor: Hisashi Nakasone, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/416,012

(22) PCT Filed: Apr. 25, 2013

(86) PCT No.: PCT/JP2013/002823
§ 371 (c)(1),
(2) Date: Jan. 20, 2015

(87) PCT Pub. No.: WO2014/024353
PCT Pub. Date: Feb. 13, 2014

(65) Prior Publication Data
US 2015/0176320 A1   Jun. 25, 2015

(30) Foreign Application Priority Data
Aug. 7, 2012   (JP) .................................. 2012-175242

(51) Int. Cl.
 *E05F 5/06* (2006.01)
 *E05F 5/02* (2006.01)
 *F16F 1/12* (2006.01)

(52) U.S. Cl.
 CPC . *E05F 5/022* (2013.01); *E05F 5/02* (2013.01); *F16F 1/12* (2013.01); *F16F 1/128* (2013.01); *E05Y 2201/474* (2013.01); *E05Y 2900/538* (2013.01)

(58) Field of Classification Search
 CPC ..... Y10T 16/61; Y10T 16/625; Y10T 16/628; Y10T 16/6285; E05F 5/00; E05F 5/003; E05F 5/006; E05F 5/02; E05F 5/022; E05F 5/06; F16F 1/44; F16F 1/445; F16F 1/3732; F16F 1/3735; B65G 69/001; B60G 2204/4502
 See application file for complete search history.

(56) References Cited

U.S. PATENT DOCUMENTS 2,967,324 A * 1/1961 Gagnier .......................... 16/86 A
3,501,187 A * 3/1970 Saksa et al. ....................... 292/1
5,010,622 A * 4/1991 Morita .............................. 16/85

(Continued)

FOREIGN PATENT DOCUMENTS

EP          1300290 A     4/2003
JP    UM-1992-016054 A   2/1992

(Continued)

OTHER PUBLICATIONS

International Search Report in International Application No. PCT/JP2013/002823, dated May 28, 2013 with an English translation thereof.

*Primary Examiner* — Chuck Mah
(74) *Attorney, Agent, or Firm* — McGinn IP Law Group, PLLC

(57) ABSTRACT

In a damper, a case member has a body, a flange formed at one end of the body, and a bottom formed at the other end of the body. A pin member has a head, that protrudes from an opening of the flange and a shaft that is connected to the head and has a stopper on an end thereof. The bottom has a retaining hole, into which the tip of the shaft is inserted, for stopping the stopper. The body has locking claws, for sandwiching the rim of the mounting hole against the flange.

7 Claims, 5 Drawing Sheets

(56) References Cited

U.S. PATENT DOCUMENTS

| | | | |
|---|---|---|---|
| 5,735,511 A * | 4/1998 | Stocker et al. | 267/140.13 |
| 5,761,766 A * | 6/1998 | Basham | 16/85 |
| 5,802,671 A * | 9/1998 | Ikuma | 16/85 |
| 6,039,388 A * | 3/2000 | Choi | 296/207 |
| 6,119,306 A * | 9/2000 | Antonucci et al. | 16/86 A |
| 6,507,976 B2 * | 1/2003 | Ichimaru | 16/82 |
| 7,114,217 B2 * | 10/2006 | Matsuzawa et al. | 16/2.2 |
| 7,356,879 B2 * | 4/2008 | Dembowsky et al. | 16/82 |
| 7,566,081 B2 * | 7/2009 | Aoyama | 296/1.03 |
| 7,703,754 B2 * | 4/2010 | Siemer et al. | 267/140.13 |
| 8,407,857 B2 * | 4/2013 | Sugiyama | 16/86 R |
| 2001/0050486 A1 * | 12/2001 | Bunting | 292/342 |
| 2002/0010977 A1 * | 1/2002 | Salice | 16/49 |
| 2004/0231099 A1 * | 11/2004 | Li | 16/85 |
| 2007/0245518 A1 * | 10/2007 | Blair | 16/85 |
| 2008/0265729 A1 * | 10/2008 | Netzer et al. | 312/330.1 |
| 2011/0167590 A1 * | 7/2011 | Ukai et al. | 16/85 |
| 2011/0252599 A1 * | 10/2011 | Kutschat | 16/82 |

FOREIGN PATENT DOCUMENTS

| | | |
|---|---|---|
| JP | 2003-214470 A | 7/2003 |
| JP | 2008-143250 A | 6/2008 |
| JP | 2009-210001 A | 9/2009 |

* cited by examiner

DAMPER

TECHNICAL FIELD

The present invention relates to a damper for damping a damping-subject member upon abutment therewith.

BACKGROUND ART

An automobile has an openable/closable mechanism including a box and a lid such as a glove box. A damper is provided to the edge of a box the glove box. When a lid of the glove box is closed, the damper functions to suppress the collision shook between the lid and the box with the elastic force by abutting on the lid.

The damping part described in Patent Document 1 includes a casing having a bottomed cylindrical shape, a retainer having a bottomed cylindrical shape and housed in the casing, and a spring abutting on the bottom of the casing and the bottom of the retainer to bias the retainer in a direction that the retainer protrudes out from an opening portion of the casing. A retaining protrusion provided on a lateral face of the retainer is engaged into an engagement window provided on a lateral face of the casing, and thereby retaining the retainer the biasing force of the spring.

CITATION LIST

Patent Literature

Patent Document 1

JP-2009-210001-A

SUMMARY OF THE INVENTION

Problem that the Invention is to Solve

In the technique disclosed in Patent Document 1, in putting the retaining protrusion of the retainer into the engagement window, the retaining protrusion warps inwardly in the radial direction. Thus, it is required to secure a given space between the retaining protrusion and the spring disposed inside of the retainer, which increases the outside diameter of the damping part by the given space. In addition, because the retaining protrusion of the retainer is disposed on the lateral face, the spring is disposed inside of the retainer in the radial direction. Thus, the outside diameters of the retainer and the casing are larger than the spring, which increases the outside diameter of the damping part.

The present invention is made in view of the above problems, and an object of the present invention is to provide a damper having a reduced outside diameter.

Means for Solving the Problem

In order to solve the above-described problem, an aspect of the present invention provides a damper to be mounted on a mounting hole to thereby damp a damping-subject member upon abutment therewith, the damper including:

a case member including
a main body portion,
a flange portion provided at one end of the main body portion, and
a bottom portion provided at the other end of the main body portion;
a pin member including
a head portion that is disposed to protrude out of an opening portion provided to the flange portion, thereby abutting on the damping-subject member, and
a shaft portion having one end connected to the head portion and the other end provided with a retained portion; and
a spring member housed in the case member while surrounding the shaft portion, the spring member having one end abutting on the pin member and the other end abutting on the case member to bias the pin member in a direction that the pin member protrudes out from the opening portion,
wherein the bottom portion includes a retaining hole formed to receive the other end of the shaft portion to thereby retain the retained portion, and
wherein the main body portion includes an engagement pawl protruding outwardly from a lateral face in a radial direction, the engagement pawl being flexible inwardly in the radial direction, the engagement pawl sandwiching an edge of the mounting hole with the flange portion.

According to the above-mentioned aspect, the retained portion of the pin member is disposed at the bottom portion of the case member, thereby reducing the outside diameter of the case member compared with a case where the retained portion of the pin member is disposed on the lateral face of the case member. In addition, the pin member is disposed inside of the spring member, thereby reducing the outside diameter of the case member toward the outside diameter of the spring member. Thus, the damper 10 can be reduced in size.

Also, another aspect of the present invention provides a damper to be mounted on a mounting hole to thereby damp a damping-subject member upon abutment therewith, the damper including:

a case member including
a main body portion,
a flange portion provided at one end of the main body portion, and
a bottom portion provided at the other end of the main body portion;
a pin member including
a head portion that is disposed to protrude out of an opening portion provided to the flange portion, thereby abutting on the damping-subject member, and
a shaft portion having one end connected to the head portion and the other end provided with a retained portion; and
a spring member housed in the case member while surrounding the shaft portion, the spring member having one end abutting on the pin member and the other end abutting on the case member to bias the pin member in a direction that the pin member protrudes out from the opening portion,
wherein the main body portion includes an engagement portion formed to be mounted on the mounting hole
wherein the bottom portion includes a retaining hole formed to receive the other end of the shaft portion to thereby retain the retained portion, and
wherein the retaining hole is radially expandable upon insertion of the retained portion thereinto.

According to the above-mentioned aspect, the retained portion of the pin member is disposed at the bottom portion of the case member, thereby reducing the outside diameter of the case member compared with a case where the retained portion of the pin member is disposed on the lateral face of the case member. In addition, pushing the retained portion of the pin member into the retaining hole makes the retaining hole radially expanded, thereby facilitating the assembly operation of the damper.

Advantageous Effects of Invention

According to the present invention, the outside diameter of the damper can be reduced.

MODE FOR CARRYING OUT THE INVENTION

Figure 1:
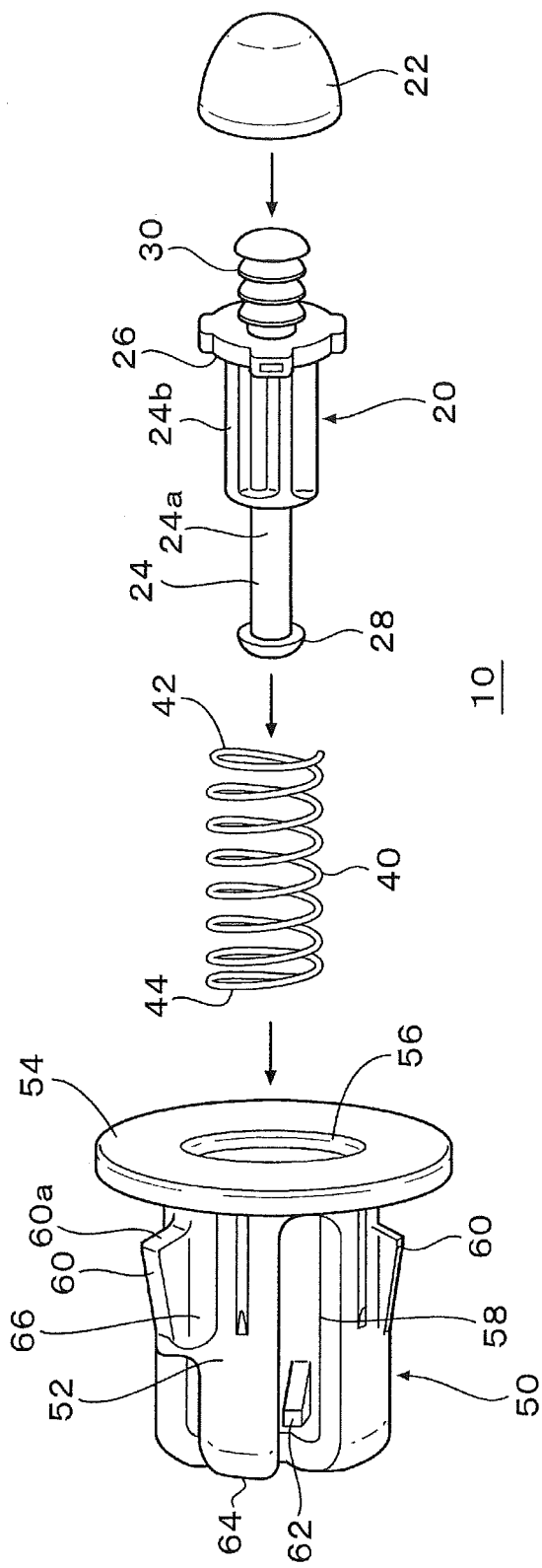
FIG. 1 An assembly drawing of a damper according to an embodiment of the present invention.

FIG. 1 is an assembly drawing of a damper 10 according to an embodiment of the present invention. A mounting hole is provided to the edge of an opening of a box of a glove box of a vehicle, and the damper 10 is mounted to the mounting hole. The damper 10 abuts on a contact face of the lid in the course of closing it to thereby suppress the collision shook. In addition, when the lid has been closed, the damper 10 abutting on the contact face of the edge of the lid functions as a biasing device to bias the lid in the opening direction. In the glove box, the box is a fixed body to be fixed to the vehicle, and the lid is an openable/closable body capable of opening and closing the opening of the box, and functions as a damping-subject member.

The damper 10 includes a coil-shaped spring member 40, a pin member 20 to be inserted into the spring member 40, and a case member 50 to house the spring member 40. The damper 10 is assembled from these members to be in one unit.

The pin member 20 includes a head portion 22 capable of abutting on the damping-subject member, and a rod-shaped shaft portion 24 connected to the head portion 22 and provided with a retained portion 28 at the distal end, and a spring bearing portion 26 having a flange shape and provided to the shaft portion 24 on the side of the head portion 22.

The head portion 22 is made from a rubber material, and is separated from the main body of the pin member 20 made from a plastics material. The head portion 22 is connected to the main body of the pin member 20 by a connecting portion 30. The shaft portion 24 includes a small-diameter portion 24a including the retained portion 28 and a large-diameter portion 24b including the spring bearing portion 26. The large-diameter portion 24b is larger in diameter than the small-diameter portion 24a including the retained portion 28. The retained portion 28 is formed by the distal end of the small-diameter portion 24a, which extends outwardly in the radial direction.

The case member 50 has a cup shape and includes a main body portion 52, a flange portion 54 including an opening portion 56 and provided at one end of the main body portion 52, and a bottom portion 64 provided at the other end of the main body portion 52. The case member 50 is arranged to be fixed to the edge of the mounting hole. A space to house the pin member 20 and the spring member 40 is provided inside of the main body portion 52, and the housing space communicates with the opening portion 56.

The spring member 40 is housed in the case member 50 while surrounding the shaft portion 24. A first end portion 42 of the spring member 40 abuts on the spring bearing 26 while a second end portion 44 of the spring member 40 abuts on the case member 50. The spring member 40 biases the pin member 20 in a direction that the pin member 20 protrudes out from the opening portion 56. Thus, the head portion 22 of the pin member 20 protrudes out of the opening portion 56. A detailed description of the damper 10 will be provided with reference to FIGS. 2A to 2D.

Figure 2:
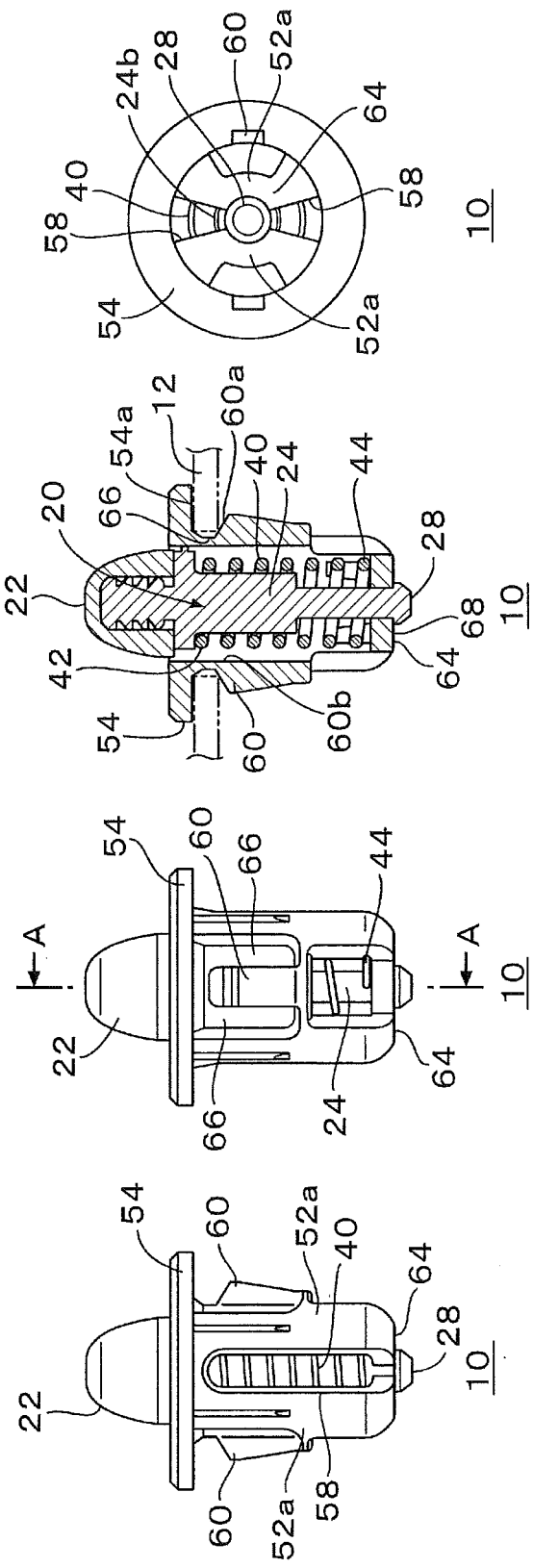
FIGS. 2A-2D Views for illustrating the configuration of the damper.

FIGS. 2A to 2D are views for illustrating the configuration of the damper 10. FIGS. 2A and 2B are side views of the damper 10 seen from different angles. FIG. 2C is a cross-sectional view of the damper 10 taken along the line A-A of FIG. 2B. FIG. 2D is a bottom view of the damper 10. Same or equivalent components and members shown in the drawings are provided with same reference numerals, and repeated descriptions of the same or equivalent components and members are omitted as appropriate. FIG. 2C shows the state where the damper 10 is mounted on a mounting member including the mounting hole.

The spring member 40 is housed in the case member 50, and the pin member 20 has its shaft portion 24 housed in the case member 50 while having its head portion 22 protruding outwardly as shown in FIG. 2A. The case member 50 includes the main body portion 52, the flange portion 54, the opening portion 56, slits 58, engagement pawls 60, inwardly-protruding portions 62, the bottom portion 64, thin-wall portions 66, and a retaining hole 68.

The plural engagement pawls 60 for sandwiching the edge of the mounting hole between the engagement pawls 60 and the flange portion 54 are provided on the lateral face of the main body portion 52. The engagement pawls 60 protrude outwardly in the radial direction. A back face 54a of the flange portion 54 and engagement faces 60a of the engagement pawls 60 sandwich the edge of the mounting hole provided to the mounting member 12 as shown in FIG. 2C.

The engagement pawls 60 are flexible inwardly in the radial direction. More specifically, the peripheries of the engagement pawls 60 are provided with elasticity, because the periphery of each engagement pawl 60 except the lower portion, that is the both sides and the upper portion of each engagement pawl. 60 are formed thinly to thereby form the thin-wall portion 66 as shown in FIG. 2B. Connecting portions continuously connecting the engagement faces 60a of the engagement pawls 60 and a root portion of the flange portion 54 also make up the thin-wall portions 66 as shown in FIG. 2C. The thin-wall portions 66 are thinner than the average thickness of the engagement pawls 60 and the average thickness of the main body portion 52. By pushing the damper 10 into the mounting hole of the mounting member 12, the engagement pawls 60 warp to allow the damper 10 to be mounted, thereby facilitating the assembly operation of the damper 10.

When the damper 10 is mounted on the mounting member 12, the engagement pawls 60 warp inwardly in the radial direction when passing through the mounting hole. In the case of the engagement pawls having a free end, if the engagement pawls are warped inwardly because of improper mounting, the engagement pawls may not recover from that state. The engagement pawls 60 according to the present embodiment include no free end but include the thin-wall portions 66. Thus, the engagement pawls 60 can be prevented from being caught by the spring member 40 or the like when it is warped. Inner walls 60b of the engagement pawl 60 are separated from the outer circumference of the spring member 40 by a distance such that the engagement pawls 60 can warp inwardly when inserted into the mounting hole.

The retained portion 28 is retained by the retaining hole 68 provided in the center of the bottom portion 64 as shown in FIG. 2C. The retaining hole 68 is smaller in diameter than the retained portion 28 in a free state, and is arranged to retain the retained portion 28 when the distal end of the shaft portion 24 is inserted thereinto. The retained portion of the pin member 20 is disposed at the bottom portion 64 of the case member 50, thereby reducing the outside diameter of the case member 50 compared with a case where the retained portion of the pin member 20 is disposed on the lateral face of the case member 50. The spring member 40 is required to have a given coil diameter in order to obtain a given elastic force.

The damper 10 has a simple structure such as including the rod-like shaft portion 24, the spring member 40 surrounding the shaft portion 24, the case member 50 surrounding the spring member 40 as described above, so that the outside diameter of the main body portion 52 of the damper 10 can be made smaller, thereby reducing the size of the damper 10. Reducing the size of the damper 10 can reduce the space in the box to which the damper 10 is mounted, thereby increasing the capacity of the box.

The main body portion 52 includes the plural slits 58 extending from the retaining hole 68 to the vicinity of the flange portion 54 along the axial direction as shown in FIGS. 2A and 2D. Thus, the main body portion 52 includes plural leg pieces 52a formed by the plural slits connected to the retaining hole 68 in the axial direction. The distal ends of the leg pieces 52a have free ends, and the retaining hole 68 is provided thereto.

Pushing the shaft portion 24 of the pin member 20 into the retaining hole 68 at the time of assembly spreads the leg pieces 52a to open because the retained portion 28 is larger in diameter than the engagement pawls 60. When the leg pieces 52a open, the retaining hole 68 at the distal end of the leg pieces 52a is radially expanded. After the retained portion 28 passes through the retaining hole 68, the leg pieces 52a close, and the retaining hole 68 is retracted in diameter to recover. Thus, the assembly can be performed easily only by pushing the pin member 20 into the retaining hole 68 without the need of position adjustment.

The second end portion 44 of the spring member 40 abuts on the inner face of the bottom portion 64 as shown in FIG. 2C. Thus, the spring length can be sufficiently secured. The inwardly-protruding portions 62 are provided on the inner face of the main body portion 52 as shown in FIG. 1 and prevent the second end portion 44 from deviating in the radial direction in order to lower the risk that the second end portion 44 is detached from the bottom portion 64 when the bottom portion 64 expands to open. The plural inwardly-protruding portions 62 are provided in the circumferential direction.

Figure 3:
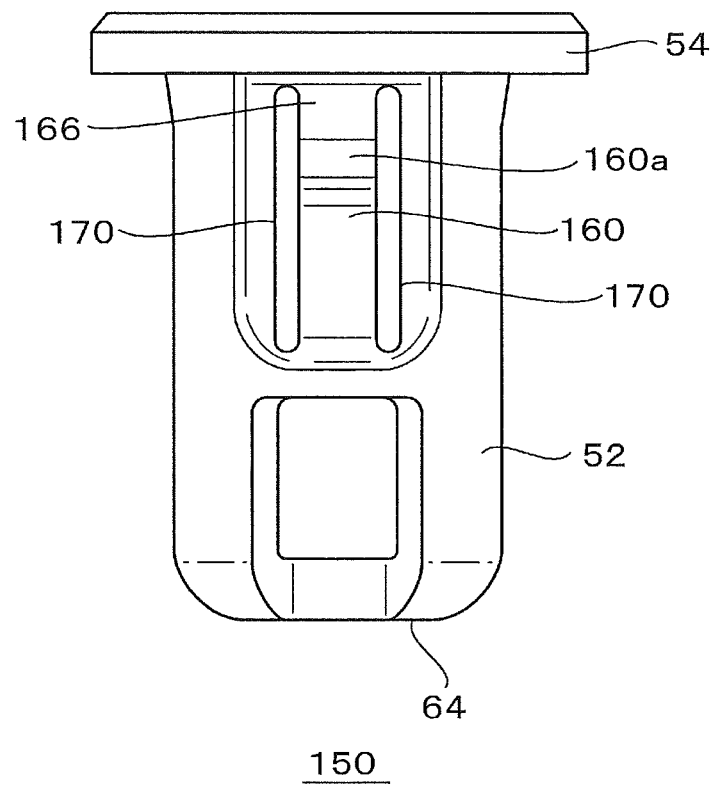
FIG. 3 A side view of the case member according to the first modification.

FIG. 3 is a side view of a case member 150 according to the first modification. In the case member 150 according to the first modification, the shape of the peripheries of engagement pawls 160 is different from that of the case member 50 shown in FIG. 2B, and the other configuration is same as that of the case member 50.

While engagement faces 160a of the engagement pawls 160 are continuously connected to a root portion of the flange portion 54 by thin-wall portions 166, notches 170 are provided on both the sides of the engagement pawls 160 along the engagement pawls 160. Because the upper ends of the engagement pawls 160 are connected by the thin-wall portions 166, the engagement pawls 160 can be prevented from not recovering after having been warped inwardly. The engagement pawls 160 have a high degree of flexibility to be warped inward more easily.

Figure 4A:
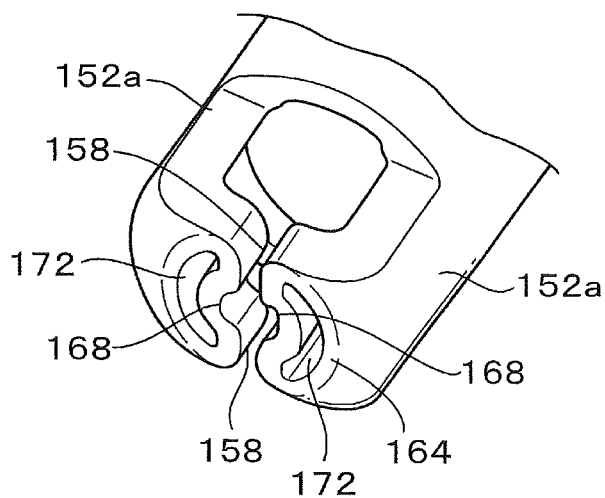
FIGS. 4A-4C Views of case members according to the second to fourth modifications.
Figure 4B:
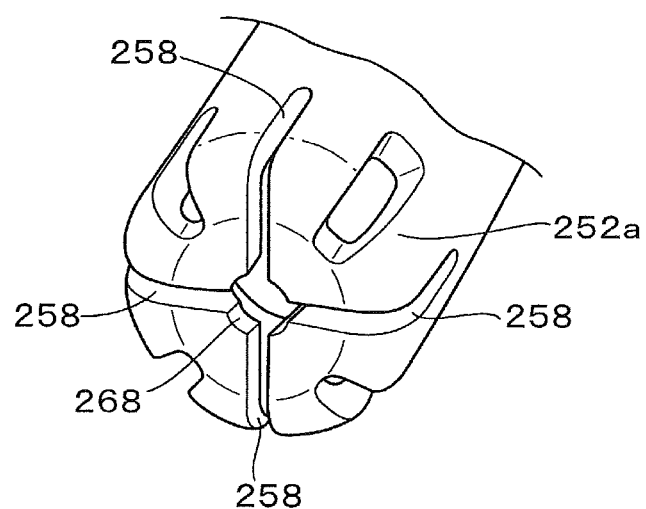
Figure 4C:
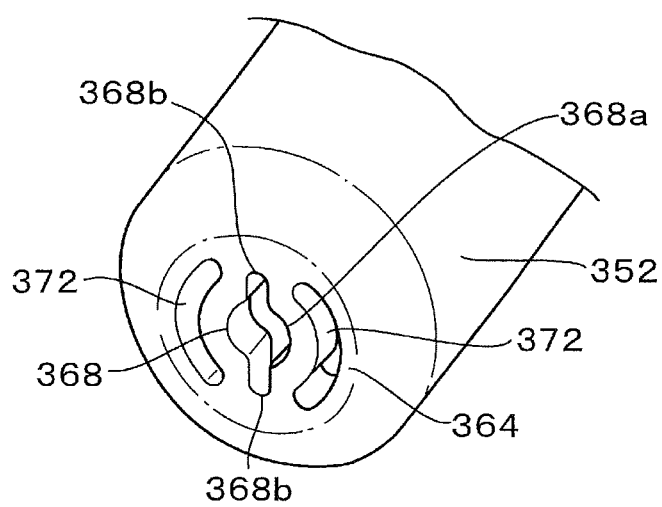

FIGS. 4A to 4C are views of case members according to modifications. FIGS. 4A to 4C are partial views of the case members showing mainly bottom portions.

A retaining hole 168 according to the second modification shown in FIG. 4A is different from the configuration of the damper 10 shown in FIG. 2D in that arc-like void portions 172 are provided on the circumference of the retaining hole 168. The void portions 172 are provided to a bottom portion 164 so as to surround the retaining hole 168. Two leg pieces 152a shown in FIG. 4A have a length in the axial direction shorter than, about half, that of the leg pieces 52a shown in FIG. 2A, and are formed so as to be prevented from opening. Thus, the arc-like void portions 172 provide the bottom portion 64 in which the retaining hole 168 is formed with elasticity in a direction of radial expansion.

In FIG. 4B, four slits 258 form four leg pieces 252a. The leg pieces 252a according to the third modification have a length in the axial direction shorter than, about half, that of the leg pieces 52a shown in FIG. 2A; however, the increased number of slits 258 make the leg pieces 252a easily open. Thus, the retaining hole 268 is formed so as to be radially expanded with moderate force.

The case member according to the fourth modification shown in FIG. 4C includes no slit or no leg piece but includes arc-like void portions 372 on the circumference of the retaining hole 368, so that the retaining hole 368 is radially expandable. The plural void portions 372 are provided to a bottom portion 364 along the outer circumference of the retaining hole 368 so as to surround the retaining hole 368. The retaining hole 368 is radially expandable with deformation of the void portions 372 when the retained portion 28 is inserted into the retaining hole 368. To be specific, when the retained portion 28 is inserted into the retaining hole 368, the inner circumferences of the void portions 372 are pushed outwardly by the retained portion 28 in the radial direction to be deformed, so that the retaining hole 368 is radially expandable. The retaining hole 368 includes a circular retaining hole 368a and slits 368b extending from the retaining hole 368a in the radial direction. The two slits 368b are disposed diagonally between the two void portions 372. The slits 368b facilitates the radial expansion of the retaining hole 368a. Because the bottom portion 364 does not expand to open, the second end portion 44 of the spring member 40 supported by the inner face of the bottom portion 364 can be prevented from being detached from the bottom portion 364.

Figure 5C:
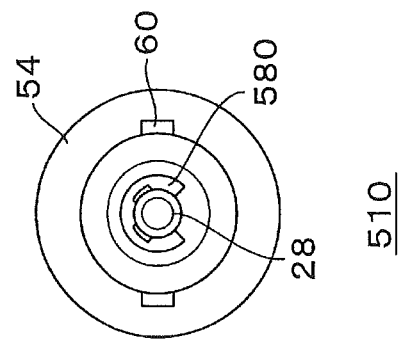
FIGS. 5A-5C Views for illustrating a damper according to the fifth modification.
Figure 5B:
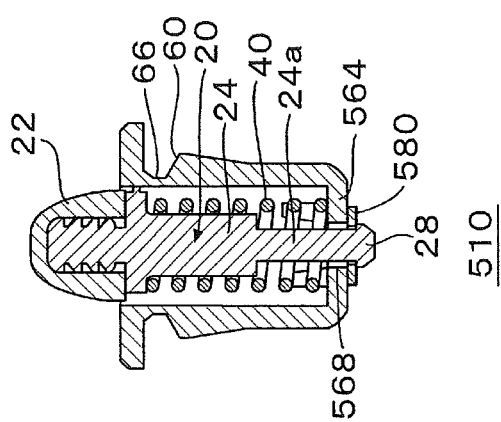
Figure 5A:
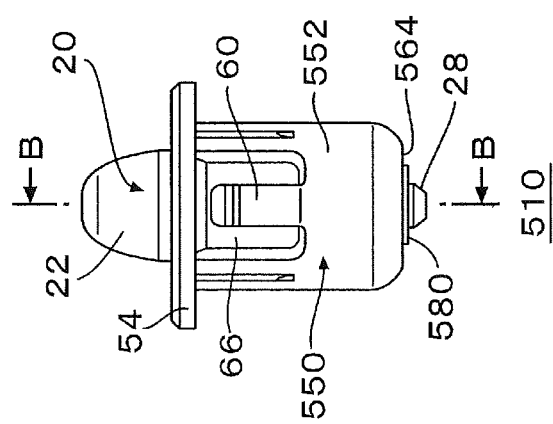

FIGS. 5A to 5C are views for illustrating a damper 510 according to the fifth modification. FIG. 5A is a side view of the damper 510. FIG. 5B is a cross-sectional view of the damper 510 taken along the line B-B of FIG. 5A. FIG. 5C is a bottom view of the damper 510.

In a case member 550 according to the fifth modification, a main body portion 552 does not include the leg pieces 52a or the slits 58 shown in FIG. 2A. A retaining hole 568 provided in the center of a bottom portion 564 has a diameter same as the retained portion 28. The pin member 20 is retained by fitting an E-type retaining ring 580 into the small-diameter portion 24a in the root of the retained portion 28 after inserting the distal end of the shaft portion 24 into the retaining hole 568. The pin member 20 can be retained in the retaining hole 568 of the bottom portion 564, and the pin member 20 can be formed into a rod shape of small diameter. Thus, the outside diameter of the main body portion 552 of the damper 510 surrounding the pin member 20 can be decreased, thereby reducing the size of the damper 510.

The present invention is not limited to the above-described embodiment, and it is also possible to add modifications such as various kinds of design changes to the embodiments based on the knowledge of those skilled in the art. Such modified embodiments will also fall within the scope of the present invention. It is also possible to combine the modifications.

The embodiment exemplifies the configuration that the damper 10 is mounted on a box of a glove box; however, the present invention is not limited to this configuration. For example, the damper 10 may be mounted on a lid of the glove box, and may abut on and damp the edge of the box when the lid is closed.

FIGS. 2A to 2D exemplify the configuration that the head portion 22 is made from a rubber material and is separated from the pin member 20; however, the present invention is not limited to this configuration. For example, the head portion 22 and the shaft portion 24 may be of a monolithic construction made from a plastics material. The head portion 22 may be separated from the shaft portion 24, and may be made from a plastics material.

The embodiment exemplifies the configuration that the engagement pawls 60 flexible inwardly in the radial direction are provided on the lateral face of the main body portion 52; however, the present invention is not limited to this configuration. For example, a configuration that an engagement protrusion that protrudes outwardly from the lateral face of the main body portion 52 in the radial direction does not warp inwardly in the radial direction is possible. The mounting hole provided to the mounting member 12 has the shape same as the cross-section surface of the main body portion 52 and the engagement protrusion in the radial direction so that the main body portion 52 and the engagement protrusion can pass through the mounting hole. To be specific, the mounting hole includes a notch having the shape of the engagement protrusion in addition to a circular notch having the shape of the main, body portion 52. An operator inserts the damper 10 including the engagement protrusion according to the modification into the mounting hole, and then rotates the damper 10 keeping the axial center. When the damper 10 is rotated, the engagement protrusion engages with the lower edge of the mounting hole, and the flange portion and the engagement protrusion can sandwich the edge of the mounting hole therebetween. According to this configuration, the space between the inner face of the engagement protrusion and the spring member 40 can be decreased, thereby reducing the outside diameter of the main body portion 52. The engagement portion functions as an engagement structure including the engagement protrusion and the engagement pawls 60.

DESCRIPTION OF REFERENCE NUMERALS AND SIGNS

10 Damper, 12 Mounting member, 20 Pin member, 22 Head member, 24 Shaft portion, 24a Small-diameter portion, 24b Large-diameter portion, 26 Spring bearing portion, 28 Retained portion, 30 Connecting portion, 40 Spring member, 42 First end portion, 44 Second end portion, 50 Case member, 52 Main body portion, 52a Leg piece, 54 Flange portion, 56 Opening portion, 58 Slit, 60 engagement pawl, 62 Inwardly-protruding portion, 64 Bottom portion, 66 Thin-wall portion, 68 Retaining hole, 580 E-type retaining ring

INDUSTRIAL APPLICABILITY

The present invention relates to a damper for damping a damping-subject member when abutting on the member.

The invention claimed is:
1. A damper to be mounted on a mounting hole to thereby damp a damping-subject member upon abutment therewith, the damper including:
a case member including
a main body portion,
a flange portion provided at one end of the main body portion, and
a bottom portion provided at the other end of the main body portion;
a pin member including
a head portion that is disposed to protrude out of an opening portion provided to the flange portion, thereby abutting on the damping-subject member, and
a shaft portion having one end connected to the head portion and the other end provided with a retained portion; and
a spring member housed in the case member while surrounding the shaft portion, the spring member having one end abutting on the pin member and the other end abutting on the case member to bias the pin member in a direction that the pin member protrudes out from the opening portion,
wherein the bottom portion includes a retaining hole formed to receive the other end of the shaft portion to thereby retain the retained portion, and
wherein the main body portion includes an engagement pawl protruding outwardly from a lateral face in a radial direction, the engagement pawl being flexible inwardly in the radial direction, the engagement pawl sandwiching an edge of the mounting hole with the flange portion.
2. The damper of claim 1,
wherein the main body portion includes plural leg pieces formed by plural slits connected to the retaining hole in an axial direction.
3. The damper of any one of claim 1,
wherein the bottom portion includes a void portion along an outer circumference of the retaining hole, and
wherein the retaining hole is radially expandable with deformation of the void portion upon insertion of the retained portion thereinto.
4. The damper of claim 1,
wherein the main body portion includes a connecting portion continuously connecting a engagement face of the engagement pawl and a root portion of the flange portion.
5. A damper to be mounted on a mounting hole to thereby damp a damping-subject member upon abutment therewith, the damper including:
a case member including
a main body portion,
a flange portion provided at one end of the main body portion, and
a bottom portion provided at the other end of the main body portion;
a pin member including
a head portion that is disposed to protrude out of an opening portion provided to the flange portion, thereby abutting on the damping-subject member, and
a shaft portion having one end connected to the head portion and the other end provided with a retained portion; and
a spring member housed in the case member while surrounding the shaft portion, the spring member having one end abutting on the pin member and the other end abutting on the case member to bias the pin member in a direction that the pin member protrudes out from the opening portion,
wherein the main body portion includes an engagement portion formed to be mounted on the mounting hole
wherein the bottom portion includes a retaining hole formed to receive the other end of the shaft portion to thereby retain the retained portion, and wherein the retaining hole is radially expandable upon insertion of the retained portion thereinto.

6. The damper of claim 5,
wherein the main body portion includes plural leg pieces formed by plural slits connected to the retaining hole in an axial direction.

7. The damper of claim 5,
wherein the bottom portion includes a void portion along an outer circumference of the retaining hole, and
wherein the retaining hole is radially expandable with deformation of the void portion upon insertion of the retained portion thereinto.

* * * * *